(12) United States Patent
Yoo et al.

(10) Patent No.: US 10,187,630 B2
(45) Date of Patent: Jan. 22, 2019

(54) EGOMOTION ESTIMATION SYSTEM AND METHOD

(71) Applicants: SK hynix Inc., Gyeonggi-do (KR); KWANGWOON UNIVERSITY INDUSTRY ACADEMIC COLLABORATION FOUNDATION, Seoul (KR)

(72) Inventors: Ji Sang Yoo, Seoul (KR); Seung Woo Seo, Incheon-si (KR)

(73) Assignees: SK Hynix Inc., Gyeonggi-do (KR); KWANGWOON UNIVERSITY INDUSTRY ACADEMIC COLLABORATION FOUNDATION, Seoul (KR)

( * ) Notice: Subject to any disclaimer, the term of this patent is extended or adjusted under 35 U.S.C. 154(b) by 170 days.

(21) Appl. No.: 15/140,151

(22) Filed: Apr. 27, 2016

(65) Prior Publication Data
US 2017/0161912 A1 Jun. 8, 2017

(30) Foreign Application Priority Data
Dec. 2, 2015 (KR) .......... 10-2015-0170338

(51) Int. Cl.
*H04N 13/02* (2006.01)
*G06T 7/20* (2017.01)
(Continued)

(52) U.S. Cl.
CPC .......... *H04N 13/246* (2018.05); *G06T 7/246* (2017.01); *G06T 7/285* (2017.01); *H04N 13/239* (2018.05);
(Continued)

(58) Field of Classification Search
CPC . G06T 2207/10021; G06T 2207/20076; G06T 2207/30244; G06T 7/246;
(Continued)

(56) References Cited

U.S. PATENT DOCUMENTS 4,969,036 A 11/1990 Bhanu et al.
6,307,959 B1 * 10/2001 Mandelbaum ............ G06T 7/55
382/104

(Continued)

FOREIGN PATENT DOCUMENTS

KR 1020130030208 3/2013
KR 1020140007092 1/2014
KR 1020150080834 7/2015

*Primary Examiner* — Md N Haque
(74) *Attorney, Agent, or Firm* — IP & T Group LLP

(57) ABSTRACT

An egomotion estimation system may include: a stereo camera suitable for acquiring a stereo image; a map generation unit suitable for generating a depth map and a disparity map using the stereo image; a feature point extraction unit suitable for extracting a feature point from a moving object in the stereo image using the disparity map; a motion vector detection unit suitable for detecting a motion vector of the extracted feature vector point; an error removing unit suitable for removing an error of the detected motion vector; and an egomotion determination unit suitable for calculating and determine an egomotion using the error-removed motion vector.

10 Claims, 2 Drawing Sheets

(51) Int. Cl.
    *H04N 13/246*   (2018.01)
    *H04N 13/271*   (2018.01)
    *G06T 7/246*    (2017.01)
    *G06T 7/285*    (2017.01)
    *H04N 13/239*   (2018.01)
    *H04N 13/00*    (2018.01)

(52) U.S. Cl.
    CPC . *H04N 13/271* (2018.05); *G06T 2207/10021* (2013.01); *G06T 2207/20076* (2013.01); *G06T 2207/30244* (2013.01); *H04N 2013/0081* (2013.01); *H04N 2013/0085* (2013.01)

(58) Field of Classification Search
    CPC ................ G06T 7/285; H04N 13/0239; H04N 13/0246; H04N 13/0271
    See application file for complete search history.

(56) References Cited

U.S. PATENT DOCUMENTS

| | | |
|---|---|---|
| 8,744,169 B2 | 6/2014 | Othmezouri et al. |
| 2005/0131646 A1* | 6/2005 | Camus ................ B60R 21/013 |
| | | 701/301 |
| 2011/0243390 A1 | 10/2011 | Eggert et al. |
| 2011/0316980 A1* | 12/2011 | Dubbelman ......... G06K 9/6211 |
| | | 348/47 |
| 2012/0308114 A1* | 12/2012 | Othmezouri ......... G05D 1/0251 |
| | | 382/154 |

* cited by examiner

EGOMOTION ESTIMATION SYSTEM AND METHOD

CROSS-REFERENCE TO RELATED APPLICATIONS

The present application claims priority of Korean Patent Application No. 10-2015-0170338 in the Korean Intellectual Property Office, filed on Dec. 2, 2015, which is incorporated herein by reference in its entirety.

BACKGROUND

1. Field

Exemplary embodiments of the present invention relate generally to egomotion technology, and, more particularly, to an egomotion estimation system and method employing a stereo camera mounted on a moving object, such as, for example, a vehicle.

2. Description of the Related Art

Egomotion refers to the three-dimensional (3D) motion of a camera. Egomotion estimation refers to an operation for estimating egomotion based on a series of images obtained by the camera.

Egomotion estimation is important for understanding and reconfiguring 3D scenes including computer vision systems for the operation of moving objects, such as moving vehicles, self-guided robots, and so forth.

For understanding and reconfiguring 3D scenes, computer vision technologies which segment image frames of a scene may be employed. However, it is difficult to segment image frames captured with a moving camera. Taking into consideration the movement of the camera, a preliminary egomotion estimation may be performed.

According to a conventional egomotion estimation, feature points are recognized in a series of image frames, tracked and compared. This method is generally too cumbersome and require systems with large calculation capacity.

According to another conventional egomotion estimation, egomotion is estimated based on land marks found within a single image frame, such as lane marking or texts on a road surface. In many cases, however, it is hard to acquire clearly defined land marks on an actual road surface.

According to yet another conventional egomotion estimation, egomotion is estimated by acquiring an image through a single moving camera, extracting feature points from the acquired image, applying an optical flow to the extracted feature points to estimate the motion vectors of the extracted feature points between frames, and applying random sample consensus (RANSAC) to the estimated motion vectors. However, many incorrect feature points may be extracted from a road surface and motion vectors based on pixel values may increase the likelihood for errors.

SUMMARY

Various embodiments of the invention are directed to an egomotion estimation system and method employing a stereo camera mounted on a system for acquiring a stereo image. The egomotion system and method generate a depth map and a disparity map from the acquired stereo image and apply an error removing means, to minimize the likelihood of an error, and estimate an egomotion.

In an embodiment, an egomotion estimation system may include: a stereo camera suitable for acquiring a stereo image; a map generation unit suitable for generating a depth map and a disparity map using the stereo image; a feature point extraction unit suitable for extracting a feature point from a moving object in the stereo image using the disparity map; a motion vector detection unit suitable for detecting a motion vector of the extracted feature vector point; an error removing unit suitable for removing an error of the detected motion vector; and an egomotion determination unit suitable for calculating and determine an egomotion using the error-removed motion vector.

In an embodiment, an egomotion estimation method may include: acquiring a stereo image; generating a depth map and a disparity map using the stereo image; extracting a feature point from a moving object in the stereo image using the disparity map; detecting a motion vector of the extracted feature vector point; removing an error of the detected motion vector; and calculating and determining an egomotion using the error-removed motion vector.

DETAILED DESCRIPTION

Figure 1:
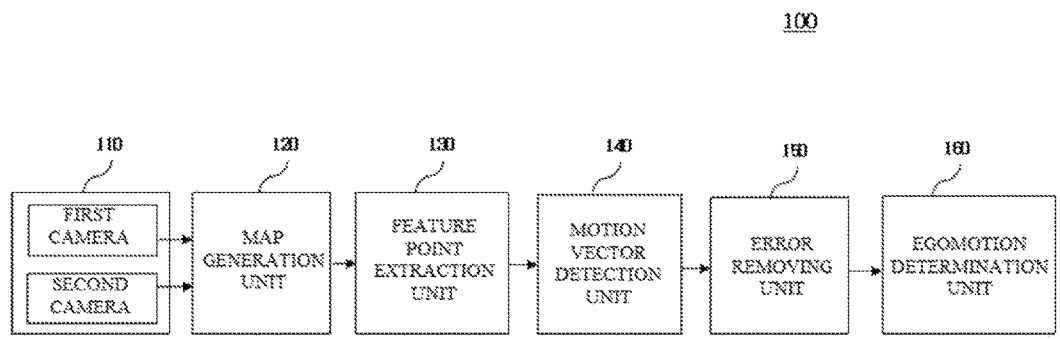
FIG. 1 illustrates an egomotion estimation system according to an embodiment of the present invention.

Various embodiments of the invention will be described below in more detail with reference to the accompanying drawings. The present invention may, however be embodied in different forms and should not be construed as being limited to the embodiments set forth herein. Rather, these embodiments are provided so that this disclosure will be thorough and complete, and will fully convey the present invention to those skilled in the relevant art. Throughout the disclosure, like reference numerals refer to like parts throughout the various figures and embodiments of the present invention.

Referring now to FIG. 1 an egomotion estimation system 100 is provided, according to an embodiment of the present invention.

Accordingly, the egomotion estimation system 100 may include a stereo camera 110, a map generation unit 120, a feature point extraction unit 130, a motion vector detection unit 140, an error removing unit 150, and an egomotion determination unit 160.

The egomotion estimation system 100 may acquire a stereo image using the stereo camera 110. The egomotion estimation system 100 may be mounted on another system, such as for example, a self-guided moving system.

The stereo camera 110 as illustrated in the embodiment of FIG. 1 may include first and second cameras. However, the stereo camera may also be a single stereo camera having at least two lenses and image sensors.

The stereo camera 110 may be mounted on a specific system such as a moving object or system. The moving object or system may be self-guided or remotely guided. For example, the moving object or system may be a vehicle or a robot, including a self-guided vehicle or robot The first and second cameras may each be a 2D or a stereo camera. The first and second cameras may be 2D cameras directed to the same direction, and configured to take 2D images of the same object. In this case the stereo camera 110 may combine the images of the same object taken by the first and second cameras to generate a stereo image for the object.

The first and second cameras may be stereo cameras, i.e. 3D cameras. The first and second stereo cameras may be directed to the same direction, and each configured to take 3D images of the same object. The stereo camera 110, may then combine the 3D images taken by each of the first and second cameras to generate a stereo image of the object.

The stereo image generated by the first and second cameras may then be transmitted to the map generation unit 120.

The map generation unit 120 may generate depth information using the stereo image provided from the stereo camera 110.

The depth information may indicate the distance between objects based on a disparity which occurs in the stereo camera. The depth information visualized from an image may include a depth map and a disparity map.

The depth map may define a spatial distance, for example, by 256 grades, and express a space using black regions and white regions. However, the depth map may not express a positive disparity, a zero disparity and, a negative disparity which are required in a 3D image.

The disparity map may express the positive disparity, the zero disparity, and the negative disparity through spatial information expressed by colors. Furthermore, the disparity map may express a space by more than 256 grades.

The egomotion estimation system 100 may generate the depth map and the disparity map using the stereo image acquired from the stereo camera 110, recognize a surrounding environment and the distances between the camera and the surroundings through the depth map and the disparity map, and acquire a more accurate result than existing systems. Employing a stereo camera 110 having two cameras capturing two images for the same object is advantageous over systems using a single camera for taking a mono image of an object.

The feature point extraction unit 130 may calculate a pixel value accumulated in the disparity map. When the pixel value is equal to or less than a reference value, the feature point extraction unit 130 may determine that the corresponding object is a road surface with no objects, and remove the corresponding object from the image. Then, the feature point extraction unit 130 may extract the feature points from moving objects in the image. For example, the feature point extraction unit 130 may analyze the stereo image transmitted from the stereo camera 110 and the disparity map generated through the stereo image, and extract the feature points from the moving objects among objects in front of the stereo camera.

The motion vector detection unit 140 may apply the optical flow to the extracted feature points, and calculate the motion vectors of the feature points between frames.

The egomotion may be acquired through a "structure from motion" (SFM) technique. For example, an x-axis motion (pitch), a y-axis motion (roll), and a z-axis motion (yaw) which are linear motions with respect to the respective axes, and an x-axis rotation (lateral), a y-axis rotation (longitudinal), and a z-axis rotation (yaw), which are rotational motions with respect to the respective axes, may be acquired through an SFM technique. An SFM equation may be as Equation 1 below.

$$\begin{bmatrix} u \\ v \end{bmatrix} = \frac{1}{Z} \begin{bmatrix} -f & 0 & x \\ 0 & -f & y \end{bmatrix} \begin{bmatrix} T_x \\ T_y \\ T_z \end{bmatrix} + \quad \text{[Equation 1]}$$

-continued $$\frac{1}{f} \begin{bmatrix} xy & -(f^2+x^2) & fy \\ f^2+y^2 & -xy & -fx \end{bmatrix} \begin{bmatrix} W_x \\ W_y \\ W_z \end{bmatrix}$$

In Equation 1, x and y represent the coordinates of an image, and u and v represent the motion vectors of the corresponding coordinates. Furthermore, $T_x$, $T_y$, and $T_z$ represent the linear motions of the system 100, and $W_x$, $W_y$, and $W_z$ represent the rotational motions of the system 100. Furthermore, f represents the focal distance of the camera, and Z represents an actual distance between the camera and a corresponding point.

Since Equation 1 includes six variables ($T_x$, $T_y$, and $T_z$; and $W_x$, $W_y$ and $W_z$), the calculation is rather complex. In the case of the system 100 moving on the ground, however, the motions of the system 100 can be simplified into the z-axis linear motion $T_z$, the x-axis rotational motion $W_x$, and the y-axis rotational motion $W_y$ as expressed in the following Equation 2.

$$\begin{bmatrix} u \\ v \end{bmatrix} = \begin{bmatrix} \frac{x}{Z} & \frac{xy}{f} & -\frac{(f^2+y^2)}{f} \\ \frac{y}{Z} & \frac{f^2+y^2}{f} & -\frac{xy}{f} \end{bmatrix} \begin{bmatrix} T_z \\ W_x \\ W_y \end{bmatrix} \quad \text{[Equation 2]}$$

Accordingly, the egomotion may be obtained through the following Equation 3.

$$\begin{bmatrix} T_z \\ W_x \\ W_y \end{bmatrix} = \begin{bmatrix} \frac{x}{Z} & \frac{xy}{f} & -\frac{(f^2+y^2)}{f} \\ \frac{y}{Z} & \frac{f^2+y^2}{f} & -\frac{xy}{f} \end{bmatrix}^{-1} \begin{bmatrix} u \\ v \end{bmatrix} \quad \text{[Equation 3]}$$

The motion vectors of the corresponding coordinates may be acquired using the widely known Lucas-Kanade optical flow method. The acquired motion vectors may be divided into a vector generated by an egomotion and a vector generated by a motion of an object. The egomotion is acquired from a fixed object in the image, such as a tree or building due to the motion of the vehicle, and the motion of the object is acquired from a moving object in the image such as a pedestrian or another vehicle.

When the egomotion is calculated through the motion vector generated through the motion of the object, an incorrect result may be obtained. Thus, the egomotion estimation through the widely known random sample consensus method (RANSAC) may be performed under the supposition that the number of egomotions is larger than the number of motions of the object in the image. Since the RANSAC method can estimate a relatively correct model even when there is an error deviating from the model, the RANSAC method may be suitably applied to a model in which a majority of egomotions and a minority of object motions are combined.

The error removing unit 150 may remove an error in the detected motion vector. Since the motion vector is based on pixel values, an error is highly likely to occur. Thus the error removing unit 150 may remove the error of the motion vector using a forward-backward error removing algorithm.

The egomotion determination unit 160 may calculate and determine the egomotion using the motion vector from which the error is removed. At this time, the egomotion determination unit 160 may minimize the error by applying the RANSAC method to the motion vector, from which the error is removed, in order to determine the optimized egomotion.

The method for acquiring an egomotion using the RANSAC method will be described.

At a first step, three sample data are randomly acquired among motion vectors extracted from the feature points.

At a second step, the egomotion parameters $T_z$, $W_x$, and $W_y$ may be calculated by Equation 3 and the acquired sample data. The motion vectors for the respective feature points may be acquired by Equation 2 and the calculated egomotion parameters.

At a third step, an error in the egomotion parameters for the sample data is calculated through Equation 4.

$$e = \sum_{p \in I} |u'_p - u_p| + |v'_p - v_p| \qquad \text{[Equation 4]}$$

In Equation 4, p represents a feature point extracted from the image, and I represent all feature points within the image. Furthermore, $u_p'$ and $v_p'$ represent motion vectors acquired by Equation 2 and the calculated egomotion parameters, and $u_p$ and $v_p$ represent motion vectors acquired through the optical flow. Furthermore, the error e may be obtained by the sum of the absolute values of differences between two vectors for all feature points.

The egomotion determination unit 160 may determine that the reliability of the egomotion is high when the error acquired through the above-described process is smaller than the previous error, or falls within a predetermined range, and determine the egomotion through repetition of the above-described steps.

Figure 2:
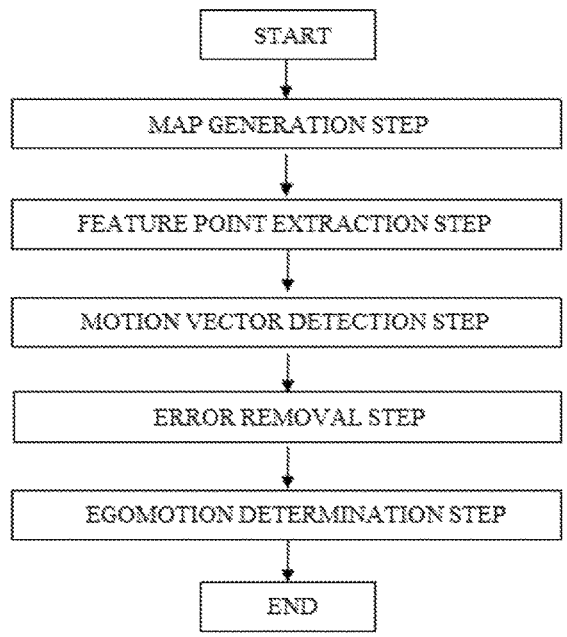
FIG. 2 is a flowchart illustrating an egomotion estimation method, according to an embodiment of the present invention.

FIG. 2 is a flowchart illustrating the egomotion estimation method according to an embodiment of the present invention.

Referring to FIG. 2, the egomotion estimation method may include first to fifth steps 100 to 500.

At a map generation step 210 corresponding to the first step, the egomotion estimation system 100 generates the depth map and the disparity map using the stereo image acquired by the stereo camera 110.

At a feature point extraction step 220 corresponding to the second step, the egomotion estimation system 100 calculates a pixel value accumulated in the disparity map. When the pixel value is equal to or less than a reference value, the egomotion estimation system 100 determines that the corresponding object is a road surface, and removes the corresponding object from the image. Then, the egomotion estimation system 100 extracts a feature point from the moving object in the image, from which the road surface is removed.

At a motion vector calculation step 230 corresponding to the third step, the egomotion estimation system 100 applies the optical flow to the extracted feature point, and calculates a motion vector of the feature point between frames.

At an error removal step 240 corresponding to the fourth step, the egomotion estimation system 100 removes an error of the detected motion vector. At this time, the egomotion estimation system 100 removes the error of the motion vector using the forward-backward error removing algorithm.

Figure 3:
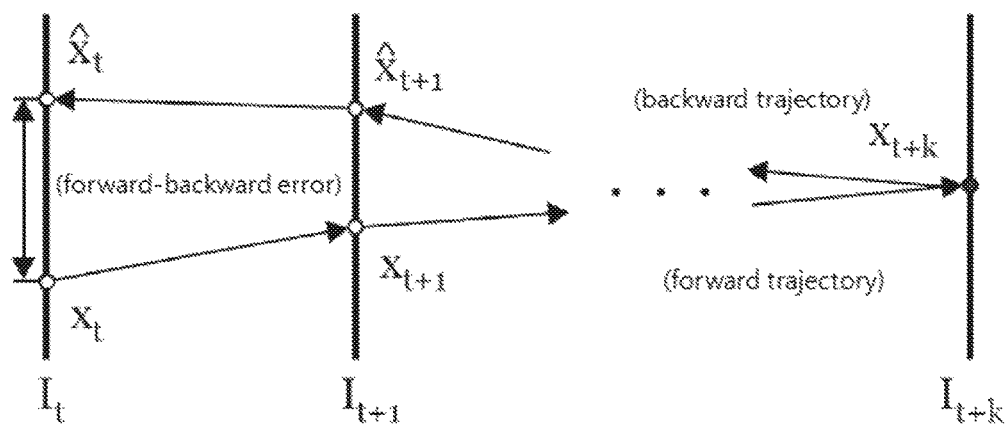
FIG. 3 illustrates an error removing method including a forward-backward algorithm employed in an egomotion estimation method, according to an embodiment of the present invention.

That is as illustrated in FIG. 3 the egomotion estimation system 100 removes the forward-backward error of the motion vector using an error removing algorithm through a forward trajectory and a backward trajectory.

At an egomotion determination step 250 corresponding to the fifth step, the egomotion estimation system 100 applies the RANSAC to the motion vector from which the error is removed, and calculates and determines the optimized egomotion.

According to an embodiment of the present invention, the egomotion estimation system and method include generating a depth map and a disparity map using a stereo image acquired through a stereo camera, apply a forward-backward error removing algorithm and the RANSAC method to remove the motion vector error, and estimate the optimized egomotion.

The egomotion estimation system and method can estimate the egomotion of a moving body having a stereo camera mounted thereon. The egomotion estimation system and method may also estimate the moving direction of objects positioned in front of a moving body, thereby preventing a collision between the moving body and the objects.

According to an embodiment of the present invention, the egomotion estimation system and method may generate the depth map and the disparity map using the stereo image acquired through a stereo camera including a first and a second camera, not just one camera, remove an error of a motion vector by applying the forward-backward error removing algorithm and RANSAC, and estimate the optimized egomotion.

Although various embodiments have been described for illustrative purposes, it will be apparent to those skilled in the art that various changes and modifications may be made without departing from the spirit and/or scope of the invention as defined in the following claims.

What is claimed is:

1. An egomotion estimation system based on a computer for estimating an egomotion of a moving system mounted a stereo camera comprising:

the stereo camera configured to acquire a stereo image; and the computer configured to estimate the egomotion of the moving system, wherein the computer generates depth information indicating a distance between objects based on a disparity in the stereo image, the depth information being visualized as a depth map and a disparity maps, calculates a pixel value accumulated in the disparity map, when the pixel value is equal to or less than a reference value, determine an corresponding object as a road surface, remove the corresponding object from the stereo image, and extract a feature point from a moving object in the stereo image using the disparity map, detects a motion vector of the extracted feature point by applying an optical flow to the extracted feature point, removes an error of the detected motion vector using a forward-backward error removing algorithm, calculates egomotion parameters using the error-removed motion vector, calculates motion vector for the feature point through the egomotion parameters, calculates an error in the egomotion parameters for the feature point by summing absolute value of difference between the motion vector detected through the optical flow and the motion vector calculated through the egomotion parameters, and determines the egomotion by repeating the steps when the error is within a predetermined range.

2. The egomotion estimation system of claim 1, wherein the computer calculates and determines the egomotion by applying random sample consensus (RANSAC) to the error-removed motion vector.

3. The egomotion estimation system of claim 1, wherein the stereo camera comprises a first and second cameras mounted on the moving system.

4. The egomotion estimation system of claim 3, wherein the first and second cameras are 2D cameras capturing first and second images for the same object and wherein the stereo camera generates a stereo, image from said first and second images of the same object.

5. The egomotion estimation system of claim 3, wherein the first and second cameras are 3D cameras capturing first and second images for the same object and wherein the stereo camera generates a stereo image from said first and second images of the same object.

6. An egomotion estimation method comprising:
acquiring a stereo image from a stereo camera mounted on a moving system;
generating depth information indicating a distance between objects based on a disparity in the stereo image, the depth information being visualized as a depth map and a disparity map;
calculating a pixel value accumulated in the disparity map;
when the pixel value is equal to or less than a reference value, determining an corresponding object as a road surface, and removing the corresponding object from the stereo image;
extracting a feature point from a moving object in the stereo image using the disparity map;
detecting a motion vector of the extracted feature point by applying an optical flow to the extracted feature point;
removing an error of the detected motion vector using a forward-backward error removing algorithm; and
calculating and determining an egomotion of the moving system using the error-removed motion vector,
wherein the calculating and determining the egomotion includes:
calculating egomotion parameters using, the error-removed motion vector;
calculating motion vector for the feature point through the egomotion parameters;
calculating an error in the egomotion parameters for the feature point by summing absolute value of difference between the motion vector detected through the optical flow and the motion vector calculated through the egomotion parameters; and
determining the egomotion by repeating the steps when the error is thin a predetermined range.

7. The egomotion estimation method of claim 6, wherein the calculating and determining of the egomotion is performed by applying RANSAC to the error-removed motion vector.

8. The egomotion estimation method of claim 6, wherein the stereo camera comprises a first and second cameras mounted on the moving system.

9. The egomotion estimation method of claim 8, wherein the first and second cameras are 2D cameras capturing first and second images for the same object and wherein the stereo camera generates a stereo image from said first and second images of the same object.

10. The egomotion estimation system of claim 8, wherein the first and second cameras are 3D cameras capturing first and second images for the same object and wherein the stereo camera generates a stereo image from said first and second images of the same object.

* * * * *